（12) United States Patent
Raiser

(10) Patent No.: US 6,177,736 B1
(45) Date of Patent: Jan. 23, 2001

(54) DC/DC CONVERTER FOR A FUEL CELL PROVIDING BOTH A PRIMARY AND AUXILIARY OUTPUT VOLTAGE

(75) Inventor: Stephen W. Raiser, Egelsbach (DE)

(73) Assignee: General Motors Corporation, Detroit, MI (US)

( * ) Notice: Under 35 U.S.C. 154(b), the term of this patent shall be extended for 0 days.

(21) Appl. No.: 09/438,831

(22) Filed: Nov. 12, 1999

(51) Int. Cl.$^7$ .................................................. H02J 3/00
(52) U.S. Cl. .............................................. 307/17; 323/222
(58) Field of Search ............... 323/222; 307/19, 307/17, 28

(56) References Cited

U.S. PATENT DOCUMENTS

| | | | |
|---|---|---|---|
| 4,323,957 | * 4/1982 | Clark, Jr. et al. | 363/21 |
| 4,549,254 | * 10/1985 | Kissel | 323/222 |
| 5,272,017 | 12/1993 | Swathirajan et al. | |
| 5,316,871 | 5/1994 | Swathirajan et al. | |
| 5,605,770 | 2/1997 | Andreoli et al. | |
| 5,763,113 | 6/1998 | Meltser et al. | |
| 5,973,483 | * 10/1999 | Jo | 323/222 |
| 6,005,781 | * 12/1999 | Balakirshnan | 323/222 |

* cited by examiner

Primary Examiner—Shawn Riley
(74) Attorney, Agent, or Firm—A. Luke Simon; Linda M. Deschere

(57) ABSTRACT

A DC/DC converter for a fuel cell includes an input node for receiving DC supply power from the fuel cell and an output node for providing a first DC output voltage. A first inductor includes a first winding having a first terminal and a second terminal, with the first terminal coupled with the input node for receiving DC supply power from the fuel cell. A switch is coupled between the second terminal of the first winding and ground. A control circuit switches the switch between an open position and a closed position. A first capacitor is coupled between the output node and ground. A first diode is coupled between the second terminal of the first winding and the output node for preventing current from flowing from the first capacitor to the second terminal of the first winding. A second winding is disposed in a transformer relationship with the first winding for producing a second output voltage. An AC/DC circuit rectifies AC voltage from the second winding and provides a constant second DC output voltage.

20 Claims, 1 Drawing Sheet

DC/DC CONVERTER FOR A FUEL CELL PROVIDING BOTH A PRIMARY AND AUXILIARY OUTPUT VOLTAGE

FIELD OF THE INVENTION

The present invention relates to a DC/DC converter and, more particularly, to a DC/DC converter for a fuel cell.

BACKGROUND OF THE INVENTION

Fuel cells have been used as a power source in many applications. Fuel cells have also been proposed for use in electrical vehicular power plants to replace internal combustion engines. However, many electric-powered vehicles require both a primary operating voltage and an auxiliary operating voltage. Typically, such vehicles require a high primary operating voltage, e.g. 400 volts DC, and a low auxiliary operating voltage, e.g. 12 volts DC. Conventional fuel cell arrangements provide a single supply power. Thus, supplying such dual operating voltages from a conventional fuel cell arrangement presents output voltage level problems.

As a partial solution, DC/DC boost converters, sometimes referred to as DC/DC step-up converters, have been proposed to increase the fuel cell supply voltage up to the required primary operating voltage, 400 VDC. However, conventional DC/DC boost converters do not supply the required auxiliary operating voltage, 12 VDC. Accordingly, it would be desirable to provide a DC/DC converter for receiving power from a fuel cell and producing both a primary and auxiliary output voltage.

SUMMARY OF THE INVENTION

The present invention is a DC/DC converter for a fuel cell. The converter includes an input node for receiving DC supply power from the fuel cell and an output node for providing a first DC output voltage. A first inductor includes a first winding having a first terminal and a second terminal, with the first terminal coupled with the input node for receiving DC supply power from the fuel cell. A switch is coupled between the second terminal of the first winding and ground. A control circuit switches the switch between an open position and a closed position. A first capacitor is coupled between the output node and ground. A first diode is coupled between the second terminal of the first winding and the output node for preventing current from flowing from the first capacitor to the second terminal of the first winding. A second winding is disposed in a transformer relationship with the first winding for producing a second output voltage. Preferably, the converter also includes an AC/DC circuit for rectifying AC voltage from the second winding and providing a constant second DC output voltage.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
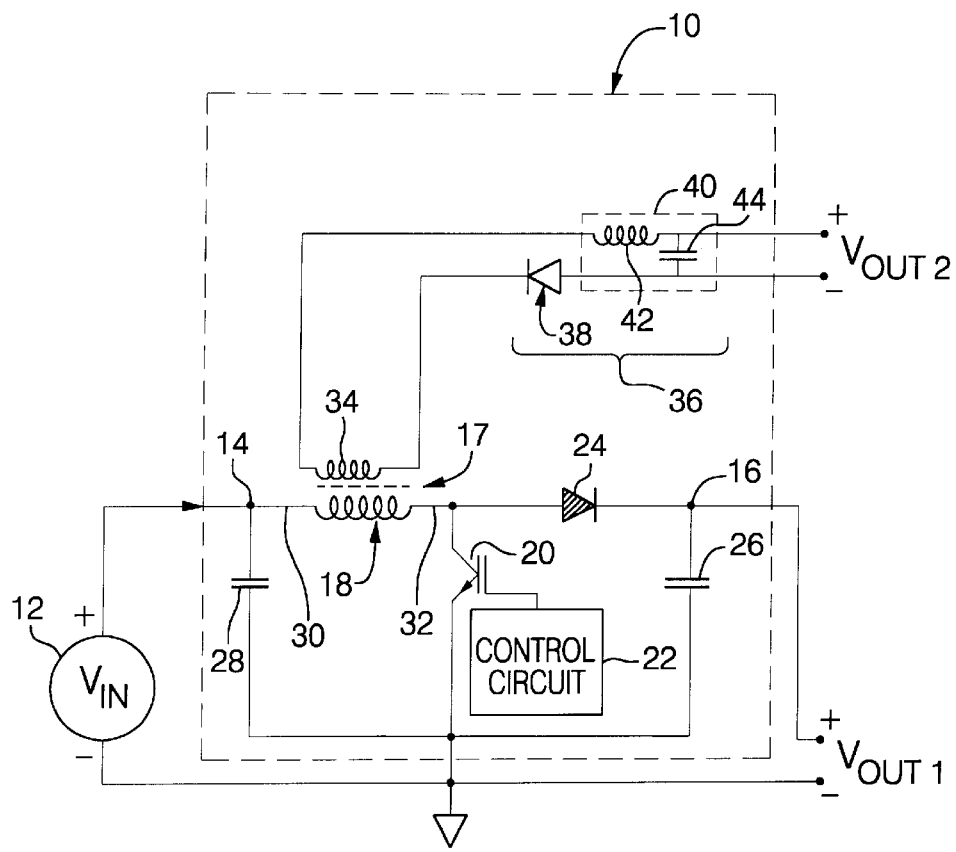
FIG. 1 is an electrical schematic diagram of a DC/DC converter for a fuel cell having an auxiliary circuit, including an auxiliary winding and rectifier, for providing an auxiliary output voltage in accordance with the present invention.

FIG. 1 is an electrical schematic diagram of a DC/DC converter 10 for a fuel cell 12 in accordance with the present invention. The term fuel cell is typically used to refer to either a single cell or a plurality of cells (stack), depending on the context. The converter 10 is designed to receive a single input voltage and generate two predetermined output voltages. Thus, when the converter 10 is installed in an electric-powered vehicle requiring both primary and auxiliary operating voltages, the predetermined output voltages are particularly generated to match such primary and auxiliary operating voltages.

The converter 10 includes an input node 14, an output node 16, a first inductor 17, a switch 20, a control circuit 22, a first diode 24, and a first capacitor 26. The input node 14 receives DC supply power from the fuel cell 12. The output node 16 provides a first DC output power labeled as $V_{OUT1}$ in FIG. 1. Preferably, the first DC output power is generated to match the required primary operating voltage. Typically, the amount of the first DC output power is 195 amps at 400 VDC.

The first inductor 17 includes a first winding or coil 18 having first and second terminals 30 and 32, respectively. The first terminal 30 of the first winding 18 is coupled with the input node 14 for receiving DC supply power from the fuel cell 12. The switch 20 is coupled between the second terminal 32 of the first winding 18 and ground. The control circuit 22 switches the switch 20 between an open position and a closed position.

The first or output capacitor 26 is coupled between the output node 16 and ground. The first diode 24 is coupled between the second terminal 32 of the first winding 18 and the output node 16 so as to prevent current from flowing from the first capacitor 26 to the second terminal 32 of the first winding 18 or the switch 20. In a preferred embodiment, the converter 10 further includes an input capacitor 28 coupled between the input node 14 and ground to buffer or smooth the DC supply power to the first terminal 30 of the first winding 18.

The converter 10 operates in a continuous cycle to provide a constant first DC output power, preferably 195 amps at 400 VDC, at the output node 16. The operational cycle of the converter 10 is best described in relation to the position of the switch 20. During a first portion of the operational cycle, the switch 20 is opened by the control circuit 22 and current from the fuel cell 12 flows through the first or boost inductor 17 and the first diode 24 to the output node 16. During this portion of the operational cycle, the output capacitor 26 is charged with voltage and the magnetic inductance field about the first winding 18 decreases or collapses. The collapse of the magnetic inductance field about the first winding 18 increases the voltage at the output node 16 up to the first DC output voltage, preferably 400 VDC.

During the second portion of the operational cycle, the switch 22 is closed by control circuit 22 and current from the fuel cell 12 flows through the first winding 18 and the switch 20 to ground. During this time, the magnetic inductance field about the first winding 18 increases or grows and the voltage stored in the output capacitor 26 is discharged. The discharge of voltage from the output capacitor 26 buffers or maintains the voltage at the output node 16 to the first DC output voltage, preferably 400 VDC. As a result, the first DC output voltage at the output node 16 remains relatively constant throughout the entire operational cycle. The converter 10 continuously repeats this operational cycle.

In a preferred embodiment, the switch 20 is a transistor and the control circuit 22. is a micro-controller for switching the transistor on and off to pulse-width modulate (PWM) the DC supply power through the converter 10 to the output node 16. The voltage difference across the converter 10 or, in other words, the voltage difference between the DC supply voltage and the first DC output voltage, is a function of the PWM rate or duty cycle. For example, a PWM rate of 50% (i.e. when the transistor on time is equal to the transistor off time) produces a first DC output voltage equal to the DC supply voltage multiplied by two. Thus, the first DC output voltage can be particularly generated to match most any desired voltage level by altering the PWM rate respectively. One of ordinary skill in the art will recognize that the PWM rate and values/size of the first inductor 17 and the output capacitor 26 are selected to perform the aforementioned functions and achieve the aforementioned results.

In accordance with the present invention and unlike the prior art, the converter 10 further includes a second winding or coil 34. The second winding 34 is disposed in a transformer relationship with the first winding 18. In other words, the second winding 34 is disposed in a spaced arrangement with respect to the first winding 18 such that the first winding 18 operates similar to a primary transformer winding and the second winding 34 operates similar to a secondary or auxiliary transformer winding. In a preferred embodiment, the first and second windings 18 and 34 are wound about a single iron core in the first inductor 17.

The second winding 34 includes a predetermined number of turns. When a current flows through the first winding 18, the current produces a magnetic flux in the magnetic iron core which links more or less completely with the turns of the second winding 34. The ratio of the number of first winding turns to the number of second winding turns establishes what is referred to hereinafter as a turns or transformation ratio. The turns ratio identifies the proportion of first winding voltage which is induced upon the second winding 34. Since the magnitude of the induced voltage in the second winding 34 depends on the number of second winding turns, the induced voltage may be less than, equal to, or more than the voltage applied to the first winding 18. In a preferred embodiment, the second coil 34 includes a certain number of windings so as to establish a 10:1 turns ratio between the first coil 18 and the second coil 34.

As the converter 10 is operated in the aforementioned operational cycle, the second winding 34 receives an alternating magnetic flux or inductance field from the first winding 18. For example, if the input node 14 of the converter 10 receives 100 volts DC from the fuel cell 12, then during the first portion of the operational cycle, the first terminal 30 of the first winding 18 has a voltage level of 100 VDC and the second terminal 32 of the first winding 18 has a voltage level of 400 VDC resulting in a voltage of −300 VDC across the first winding 18. At this same time, the magnetic inductance field from the first winding 18 induces a voltage of −30.0 VDC across the second winding 34, assuming a 10:1 turns ratio between the first winding 18 and the second winding 34.

During the second portion of the operational cycle, the first terminal 30 of the first winding 18 has a voltage level of 100 VDC and the second terminal 32 of the first winding 18 has a voltage level of 0 VDC resulting in a voltage of +100 VDC across the first winding 18. At this same time, the magnetic inductance field from the first winding 18 induces a voltage of +10.0 VDC across the second winding 34. As a result, the second winding 34 provides a voltage alternating between −30.0 VDC and +10.0 VDC during each operational cycle of the converter 10. In this manner, the converter 10 can provide an AC output voltage from the second winding 34 if desired.

In a preferred embodiment, the converter 10 further includes an AC/DC circuit 36 for rectifying the AC power from the second winding 34 and providing a constant second DC output voltage less than the first DC output voltage. The constant second DC output voltage is labeled as $V_{OUT2}$ in the Figures. Preferably, the constant second DC output power is particularly generated to match the required auxiliary operating voltage, typically 12 volts DC. By altering the turns ratio, the converter 10 may be adapted to generate any other desired second DC output voltage including, but not limited to, other standard vehicular operating voltages, such as 24 volts DC, 42 volts DC, or 48 volts DC.

Figure 2:
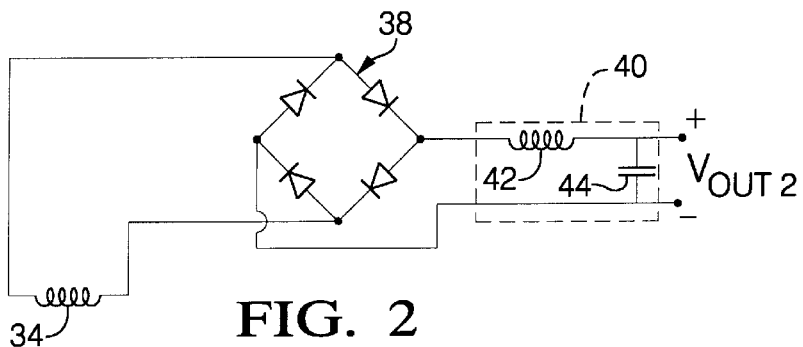
FIG. 2 is an electrical schematic diagram of a first alternative embodiment of the auxiliary circuit and rectifier in accordance with the present invention.
Figure 3:
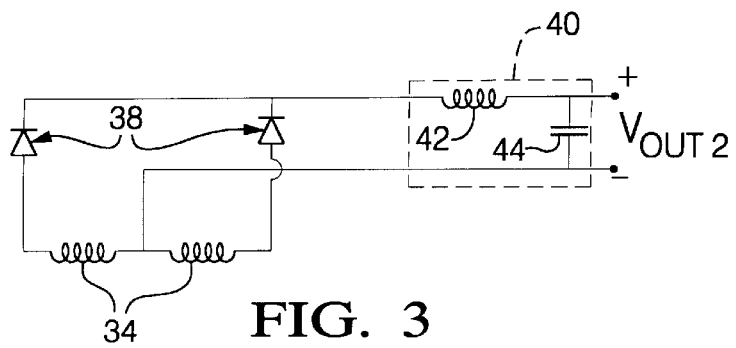
FIG. 3 is an electrical schematic diagram of a second alternative embodiment of the auxiliary circuit and rectifier in accordance with the present invention.

The AC/DC circuit 36 includes a rectifier 38 for converting the AC voltage from the second winding 34 to a DC voltage, coupled to a filter 40 for buffering the DC voltage from the rectifier 38. The filter 40 includes a second inductor 42 coupled to a second capacitor 44. In alternative embodiments of the present invention, the rectifier 38 may comprise a single diode as illustrated in FIG. 1, a full-wave bridge rectifier as illustrated in FIG. 2, or a full-wave, center-tap rectifier as illustrated in FIG. 3.

In the design of the present invention, a single diode will rectify the voltage induced from the first winding 18 to the second winding 34 during only one of the first and second portions of the aforementioned operational cycle. The single diode rectifier 38 as illustrated in FIG. 1 rectifies only the voltage induced from the first winding 18 to the second winding 34 during the first portion of the operational cycle. Thus, during the first portion of the operational cycle, induced current flows from the second winding 34 through the filter 40 thereby providing the second DC output voltage across $V_{OUT2}$. During this time, the second capacitor 44 is charged with voltage. During the second portion of the operational cycle, induced current is prevented from flowing from the second winding 34 to $V_{OUT2}$ by the single diode rectifier 38. During this time, voltage is discharged from the second capacitor 44 to buffer or maintain the voltage at $V_{OUT2}$ at the desired second DC output voltage level.

Both the full-wave bridge rectifier and the full-wave, center-tap rectifier rectify the voltage induced from the first winding 18 to the second winding 34 during both the first and second portions of the aforementioned operational cycle. Thus, the full-wave bridge rectifier and the full-wave, center-tap rectifier provide a DC voltage waveform having two different voltage levels. The filter 40 averages the different voltage levels to provide a constant second DC output voltage at $V_{OUT2}$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A DC/DC boost converter for a fuel cell, the converter comprising:

an input node for receiving DC supply power from the fuel cell;

an output node for providing a first DC output voltage;

a first inductor including a first winding having a first terminal and a second terminal, said first terminal coupled with said input node for receiving DC supply power from the fuel cell;

a switch coupled between said second terminal of said first winding and ground;

a control circuit for switching said switch between an open position and a closed position;

a first capacitor coupled between said output node and ground;

said switch and said control circuit operating in cooperation with said first winding and said first capacitor to provide the first DC output voltage at said output node, the first DC output voltage being greater than the received DC supply power;

a first diode coupled between said second terminal of said first winding and said output node for preventing current from flowing from said first capacitor to said second terminal of said first winding; and a second winding disposed in a transformer relationship with said first winding for producing a second output voltage.

2. The converter of claim 1 wherein said first and second windings are wound about a core.

3. The converter of claim 1 wherein said second output voltage is AC voltage and including an AC/DC circuit for rectifying AC voltage from said second winding and providing a constant second DC output voltage.

4. The converter of claim 3, wherein said second DC output voltage is less than said first DC output voltage.

5. The converter of claim 3, wherein said AC/DC circuit includes a rectifier coupled to a filter.

6. The converter of claim 5, wherein said rectifier is a second diode.

7. The converter of claim 5, wherein said rectifier is a full-wave bridge rectifier.

8. The converter of claim 5, wherein said rectifier is a full-wave, center-tap rectifier.

9. The converter of claim 5, wherein said filter includes a second inductor coupled to a second capacitor.

10. The converter of claim 1, wherein said switch is a transistor.

11. The converter of claim 1, wherein said control circuit is a micro-controller.

12. A DC/DC boost converter for a fuel cell, the converter having a step-up voltage circuit, including a first inductor having a first winding, for providing a first DC voltage, the improvement comprising;

a second winding disposed in a transformer relationship with said first winding for producing a second output voltage.

13. The converter of claim 12 wherein said first and second windings are wound about a core.

14. The converter of claim 12 wherein said second output voltage is AC voltage and including an AC/DC circuit for rectifying AC voltage from said second winding and providing a constant second DC output voltage.

15. The converter of claim 14, wherein said second DC output voltage is less than said first DC output voltage.

16. The converter of claim 14, wherein said AC/DC circuit includes a rectifier coupled to a filter.

17. The converter of claim 16, wherein said rectifier is a diode.

18. The converter of claim 16, wherein said rectifier is a full-wave bridge rectifier.

19. The converter of claim 16, wherein said rectifier is a full-wave, center tap rectifier.

20. The converter of claim 16, wherein said filter includes a second inductor coupled with a capacitor.

* * * * *